(12) United States Patent
Zaluski et al.

(10) Patent No.: US 11,922,493 B2
(45) Date of Patent: Mar. 5, 2024

(54) SYSTEM AND METHOD FOR DERIVING FINANCIAL CONSCIENTIOUSNESS SCORE THROUGH VISUAL CHOICES USING MACHINE LEARNING MODEL

(71) Applicant: ConfirmU Pte. Ltd, Redhill (SG)

(72) Inventors: Yatir Zaluski, Givaatayim (IS); Nemmara Chithambaram, Fremont, CA (US); Niharika Bhargava, Mumbai (IN); Namrata Jain, Mumbai (IN); Clare Frances McCaffery, Wirral (GB)

(73) Assignee: CONFIRMU PTE. LTD., Redhill (SG)

( * ) Notice: Subject to any disclaimer, the term of this patent is extended or adjusted under 35 U.S.C. 154(b) by 82 days.

(21) Appl. No.: 17/354,996

(22) Filed: Jun. 22, 2021

(65) Prior Publication Data

US 2022/0405837 A1    Dec. 22, 2022

(51) Int. Cl.
*G06Q 40/00* (2023.01)
*G06N 20/00* (2019.01)
*G06Q 40/03* (2023.01)

(52) U.S. Cl.
CPC ............ *G06Q 40/03* (2023.01); *G06N 20/00* (2019.01)

(58) Field of Classification Search
CPC ...... G06Q 40/02; G06Q 40/025; G06Q 40/03; G06N 20/00

USPC .................................................. 705/4, 35–45
See application file for complete search history.

(56) References Cited

U.S. PATENT DOCUMENTS

| | | | |
|---|---|---|---|
| 11,270,375 B1* | 3/2022 | Jennings | G06Q 40/03 |
| 2021/0073909 A1* | 3/2021 | Le Roux | G06Q 40/03 |
| 2021/0209679 A1* | 7/2021 | Sanderson | G06Q 40/03 |
| 2021/0357850 A1* | 11/2021 | Cella | G06Q 30/06 |
| 2022/0101383 A1* | 3/2022 | Bloom | G06Q 40/12 |
| 2022/0180406 A1* | 6/2022 | Palty | G06Q 20/405 |

* cited by examiner

*Primary Examiner* — Jessica Lemieux
*Assistant Examiner* — Mohammed H Mustafa

(57) ABSTRACT

A method of deriving a financial conscientiousness score from visual choices, using a machine learning model that is trained at a server is provided. The method includes (i) obtaining visual selection as an input from the user that is selected from one or more different visual choices that are displayed to the user, (ii) determining trait scores for a subset of traits based on the points that are attributed to the visual choices, (iii) training, a machine learning model by correlating the trait scores for the subset of traits with a previous credit history or a loan repayment record of the user to obtain a trained machine learning model, and (iv) determining, using the trained machine learning model, a financial conscientiousness score based on the trait scores for the subset of traits.

11 Claims, 13 Drawing Sheets

SYSTEM AND METHOD FOR DERIVING FINANCIAL CONSCIENTIOUSNESS SCORE THROUGH VISUAL CHOICES USING MACHINE LEARNING MODEL

BACKGROUND

Technical Field

The present disclosure relates to the field of machine learning, and more specifically, to deriving a financial conscientiousness score from visual choices obtained from a client device, using a machine learning model that is trained at a server.

Description of the Related Art

Credit worthiness of a consumer is determined using their credit score. The credit score is determined based on parameters such as payment history, credit utilization ratio, age of credit, etc. For a large percentage of the population, relevant data to calculate the parameters that determine their credit scores is not available. This includes young people who have not previously taken a loan or a credit card and people living in rural areas who have not yet borrowed from organized financial institutions (e.g. banks).

Psychological tests have been used to assess an individual's different abilities and attributes including achievement and ability, personality, and neurological functioning of a person. In general, these tests are conducted for clinical psychology, personality typing, pre-employment screening, management of military manpower, marketing and segmentation, marriage counseling, education, and career planning. Further, most psychological tests provide sufficient time for the individual to evaluate the individual's different abilities.

One drawback of psychological tests is that if users are asked direct questions using language, they are likely to provide answers to obtain a score which they believe would lead to the desired outcome, particularly if they have sufficient time to evaluate the question and determine what response would lead to a higher score. Further, most psychological tests are formulated in popular languages (e.g. English), and so they either have to be translated to multiple languages, or they can be misinterpreted by those who are not competent in the language used to administer the test. Finally, there are no psychological tests that can be used as such to validate the creditworthiness of the consumer.

Accordingly, there remains a need for a more efficient method for mitigating and/or overcoming drawbacks associated with current methods and systems in determining the creditworthiness of a person without having access to their credit score.

SUMMARY

In view of the foregoing, there is provided a processor-implemented method deriving a financial conscientiousness score from visual choices obtained from a client device, using a machine learning model that is trained at a server. The method includes obtaining at least one visual selection as an input from the user that is selected from one or more different visual choices that are displayed to the user by the user device. The method includes determining, trait scores for a subset of traits based on the points that are attributed to the visual choices. The traits are derived from a hybrid psychological framework, which is a combination of at least two psychological frameworks. The method includes training a machine learning model by correlating the trait scores for the subset of traits with a previous credit history or a loan repayment record of the user to obtain a trained machine learning model. The method includes determining, using the trained machine learning model, a financial conscientiousness score based on the trait scores for the subset of traits that are determined based on the visual choices that are obtained from the user device. The trained machine learning model determines an intent to repay.

In some embodiments, the processor-implemented method includes (i) providing numeracy questions related to mathematical concepts, the numerical concepts relate to at least one of numerals, calculations, logic, and interpretation of numerical content, (ii) determining a numeracy score by processing the input from the user in response to the numeracy questions, and (iii) determining, using the machine learning model, the financial conscientiousness score based on the numeracy score in combination with the trait scores of the subset of traits, the machine learning model is trained by correlating the numeracy score with the previous credit history or the loan repayment record of the user to obtain the trained machine learning model.

In some embodiments, the processor-implemented method includes retraining the machine learning model when there is a misalignment between the existing alternative credit score of the user and the financial conscientiousness/machine learning generated score that is predicted by the trained machine learning model.

In some embodiments, the processor-implemented method includes determining, using the machine learning model, the financial conscientiousness score based on an input time taken by the user, the machine learning model is trained by correlating a time taken to obtain the input from the user with the previous credit history or the loan repayment record of the user to obtain a threshold time for the trained machine learning model.

In some embodiments, the machine learning model is trained by correlating an introversion score, an extraversion score, a grandiosity score, a neuroticism score, a perceiving score, an intuition score, an integrity score, a communication score, a judging score, a numeracy score, a sensing score and a feeling score with the previous credit history or the loan repayment record of the user to obtain the trained machine learning model.

In some embodiments, the machine learning model uses a generative adversarial network (GAN) model that includes a generator and a discriminator, the generator is trained to generate a synthetic financial conscientiousness score as similar to real financial conscientiousness score, and the discriminator is trained to distinguish real and synthetically generated financial conscientiousness score.

In some embodiments, the machine learning model is trained with a combination of the financial conscientiousness score and numeracy score in association with a choice of language by the user.

In some embodiments, one or more visual questions are linked to an attainment of a goal under time constraints, are shuffled randomly, and are personalized based on previous visual selections to make it more difficult for a user to copy from another user.

In one aspect, there is provided a system for deriving a financial conscientiousness score from visual choices obtained from a client device, using a machine learning model that is trained at a server. The system includes a memory that stores a set of instructions and a processor that is configured to execute the set of instructions, which when executed by the processor causes one or more functions of the system. The system performs to (i) obtain at least one visual selection as an input from the user that is selected from one or more different visual choices that are displayed to the user by a user device, (ii) determine trait scores for one or more subset of traits based on points that are attributed to the visual choices, the traits are derived from a hybrid psychological framework, which is a combination of at least two psychological frameworks, (iii) train a machine learning model by correlating at least one of the trait scores for the subset of traits with a previous credit history or a loan repayment record of the user to obtain a trained machine learning model, and (iv) determine, using the trained machine learning model, a financial conscientiousness score based on the trait scores for the subset of traits that are determined based on the visual choices that are obtained from the user device. The trained machine learning model determines an intent to repay.

In some embodiments, the processor is configured to (i) provide numeracy questions related to numerical concepts, the numerical concepts relate to at least one of numerals, calculations, logic, and interpretation of numerical content, (ii) determining a numeracy score by processing the input from the user in response to the numeracy questions, and (iii) determining, using the machine learning model, the financial conscientiousness score based on the numeracy score, in combination with the trait scores of the subset of traits, the machine learning model is trained by correlating the numeracy score with the previous credit history or the loan repayment record of the user to obtain the trained machine learning model.

In some embodiments, the machine learning model retrains when there is a misalignment between the existing alternative credit score of the user and the financial conscientiousness/machine learning generated score that is predicted by the trained machine learning model.

In some embodiments, the processor is configured to determine the financial conscientiousness score using the machine learning model, the financial conscientiousness score based on an input time taken by the user, the machine learning model is trained by correlating a time taken to obtain the input from the user with the previous credit history or the loan repayment record of the user to obtain a threshold time for the trained machine learning model based on an input time taken by the user, the machine learning model is trained by correlating a time taken to obtain the input from the user with the previous credit history or the loan repayment record of the user to obtain a threshold time for the trained machine learning model.

In some embodiments, the machine learning model is trained by correlating an introversion score, an extraversion score, a grandiosity score, a neuroticism score, a perceiving score, an intuition score, an integrity score, a communication score, a judging score, a numeracy score, a sensing score and a feeling score with the previous credit history or the loan repayment record of the user to obtain the trained machine learning model.

In some embodiments, the machine learning model uses a generative adversarial network (GAN) model that comprises a generator and a discriminator, the generator is trained to generate a synthetic financial conscientiousness score as similar to real financial conscientiousness score, and the discriminator is trained to distinguish real and synthetically generated financial conscientiousness score.

In some embodiments, the machine learning model is trained with a combination of the financial conscientiousness score and numeracy score in association with a choice of language by the user.

In some embodiments, one or more visual questions are linked to an attainment of a goal under time constraints, are shuffled randomly, and are personalized based on previous visual selections to make it more difficult for a user to copy from another user.

In another aspect, there is provided one or more non-transitory computer-readable storage mediums storing one or more sequences of instructions, which when executed by one or more processors, causes a method deriving a financial conscientiousness score from visual choices obtained from a client device, using a machine learning model that is trained at a server. The method includes (i) obtaining at least one visual selection as an input from the user that is selected from one or more different visual choices that are displayed to the user by a user device, (ii) determining trait scores for one or more subset of traits based on the points that are attributed to the visual choices, the traits are derived from a hybrid psychological framework, which is a combination of at least two psychological frameworks, (iii) training a machine learning model by correlating at least one of the trait scores for the subset of traits with a previous credit history or a loan repayment record of the user to obtain a trained machine learning model, and (iv) determining, using the trained machine learning model, a financial conscientiousness score based on the trait scores for the subset of traits that are determined based on the visual choices that are obtained from the user device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 0.5B illustrates a graphical representation of a correlation of actual time taken with the financial conscientiousness score of the user according to some embodiments herein;

DETAILED DESCRIPTION

Figure 1:
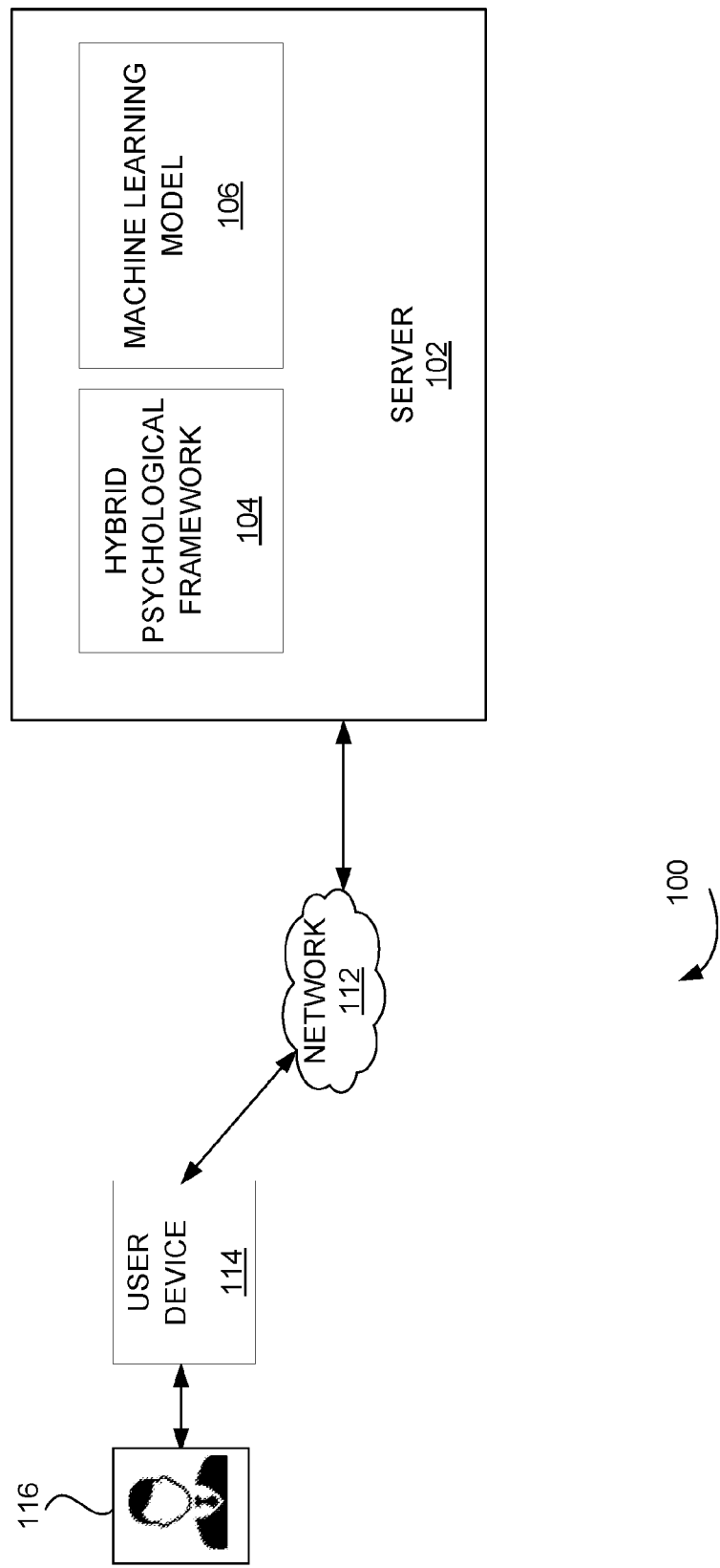
FIG. 1 is a block diagram that illustrates a system for deriving a financial conscientiousness score from visual choices obtained from a user device using a machine learning model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for determining an alternative credit score of a user based on a selection of visual choices, to detect a financial conscientiousness of the user using machine learning. Referring now to the drawings, and more particularly to FIGS. 1 through 8, where similar reference characters denote corresponding features consistently throughout the figures, preferred embodiments are shown.

FIG. 1 is a block diagram that illustrates a system 100 for deriving a financial conscientiousness score from visual choices obtained from a user device 114 using machine learning according to some embodiments herein. The system 100 includes a server 102, and a user device 114. The server 102 includes a hybrid psychological framework 104, and a machine learning model 106 A list of devices that are capable of functioning as the server 102, without limitation, may include one or more of a personal computer, a laptop, a tablet device, a smartphone, a mobile communication device, a personal digital assistant, or any other such computing device. In some embodiments, the user device 114, without limitation, is selected from a personal computer, a laptop, a tablet device, a smartphone, a mobile communication device, a personal digital assistant, or any other such computing device. The server 102 may communicate with the user device 114 through a network 112. In some embodiments, the network 112 is a wireless network. In some embodiments, the network 112 is a combination of the wired network and the wireless network. In some embodiments, the network 112 is the Internet.

The one or more visual questions along with visual choices are displayed, on a user interface of the user device 114. In some embodiments, the one or more visual questions are visualized as a game. The user 116 registers to the game to obtain login credentials.

The visual choices are images that are associated with a scenario. The server 102 receives at least one visual selection as an input from the user 116 that is selected from the one or more different visual choices. The server 102 attributes different points to one or more different visual choices. The user 116 may select the visual choice for each visual question during each level of the game according to his or her preferences. The scenarios may be added or removed or shuffled based on the at least one visual selection by the user 116. The server 102 may receive the at least one visual selection through an input device. The input device may be a mouse, a keyboard, a microphone, a camera, or a touchpad.

The server 102 determines, using the hybrid psychological framework 104, trait scores for a subset of traits based on the points that are attributed to each of the visual choices. The subset of traits is derived from the hybrid psychological framework 104. The hybrid psychological framework 104 is a combination of at least two psychological frameworks. The psychological frameworks include at least two of OCEAN (Openness, Conscientiousness, Extraversion, Agreeableness, and Neuroticism), Myers Briggs Type Indicator (MBTI), Hogan Personality Inventory, or Robert Hare Psychopathy checklist (PCL-R). The subset of traits may include at least one of sensing, judging, introversion, extraversion, grandiosity, neuroticism, perceiving, intuition or openness of experience, integrity, communication, numeracy, and feeling or agreeableness. Each visual choice may be tagged with at least one trait and may be stored in an image repository.

The machine learning model 106 is trained by correlating points at least one of the trait scores for the subset of traits with a previous credit history or a loan repayment record of the user 116. The trait scores for a subset of traits include an introversion score, an extraversion score, a grandiosity score, a neuroticism score, a perceiving score, an intuition score, an integrity score, a communication score, a judging score, a numeracy score, a sensing score, and a feeling score. The machine learning model 106 is trained by correlating at least one of the trait scores for the subset of traits with a previous credit history or a loan repayment record of the user 116.

The server 102 determines, using a trained machine learning model 106, a financial conscientiousness score based on the trait scores for the subset of traits that are determined based on the visual choices that are obtained from the user device 114. The trained machine learning model determines an intent to repay.

The machine learning model 106 may use a generative adversarial networks (GAN) model. The generative adversarial networks (GAN) model may include a logistic regression model. In some embodiments, the machine learning model 106 correlates the financial conscientiousness/machine learning generated score of the user 116 with at least one of the existing alternative credit score or progressive repayment record and retrains the machine learning model 106 when there is a misalignment between the existing alternative credit score of the user 116 with the financial conscientiousness/machine learning generated score that is predicted.

In some embodiments, the server 102 is configured to (i) provide one or more numeracy questions related to numerical concepts, the numerical concepts relate to at least one of numerals, calculations, logic, and interpretation of numerical content, (ii) determine a numeracy score by processing the input from the user 116 in response to the one or more numeracy questions, and (iii) determine, using the machine learning model 106, the financial conscientiousness score based on the numeracy score in combination with the trait scores of the subset of traits, the machine learning model is trained by correlating the numeracy score with the previous credit history or the loan repayment record of the user to obtain the trained machine learning model.

The server 102 determines, using the machine learning model 106, the financial conscientiousness score based on an input time taken by the user 116. The machine learning model 106 is trained by correlating a time taken to obtain the input from the user 116 with the previous credit history or the loan repayment record of the user to obtain a threshold time for the trained machine learning model. If the input time taken by the user 116 is more than the threshold time, then the predicted financial conscientiousness score may be low. If the input time taken by the user 116 is less than the threshold time, then the predicted financial conscientiousness score may be high. The input time taken by the user 116 is obtained at each level of the game. In some embodiments, the server 102 detects patterns of different input times taken by different users to identify whether the user 116 is copying answers from another user. The patterns may be detected by the server 102 using a classifier technique.

In some embodiments, the server 102 (i) provides a virtual currency based on the scores for the subset of traits to enable the user 116 to spend the score to purchase one or more items virtually. The virtual currency may engage the user 116 to complete the game successfully.

The machine learning model 106 is trained by correlating an introversion score, an extraversion score, a grandiosity score, a neuroticism score, a perceiving score, an intuition score, an integrity score, a communication score, a judging score, a numeracy score, a sensing score and a feeling score with the previous credit history or the loan repayment record of the user 116 to obtain the trained machine learning model. In some embodiments, an area under curve across true positive rate and false-positive rate for the introversion score, the extraversion score, the grandiosity score, the perceiving score, the intuition score, the feeling score, and the numeracy score is more than 0.5 for example. The true positive rate may be used to measure a percentage of actual positives that are correctly identified by the trained machine learning model. The false-positive rate may be related to measuring a percentage of actual positives that are not correctly identified by the trained machine learning model. Thereby, the area under the curve depicts more prediction rate of the machine learning model 106. In some embodiments, the one or more visual questions are linked to the attainment of a goal under time constraints, are shuffled randomly, and are personalized based on previous visual selections to make it more difficult for the user 116 to copy from another user. The random shuffling of visual questions depends on the previous selections for the one or more visual selections.

The server 102 may display the financial conscientiousness score of the user 116 at the end of the game.

Figure 2:
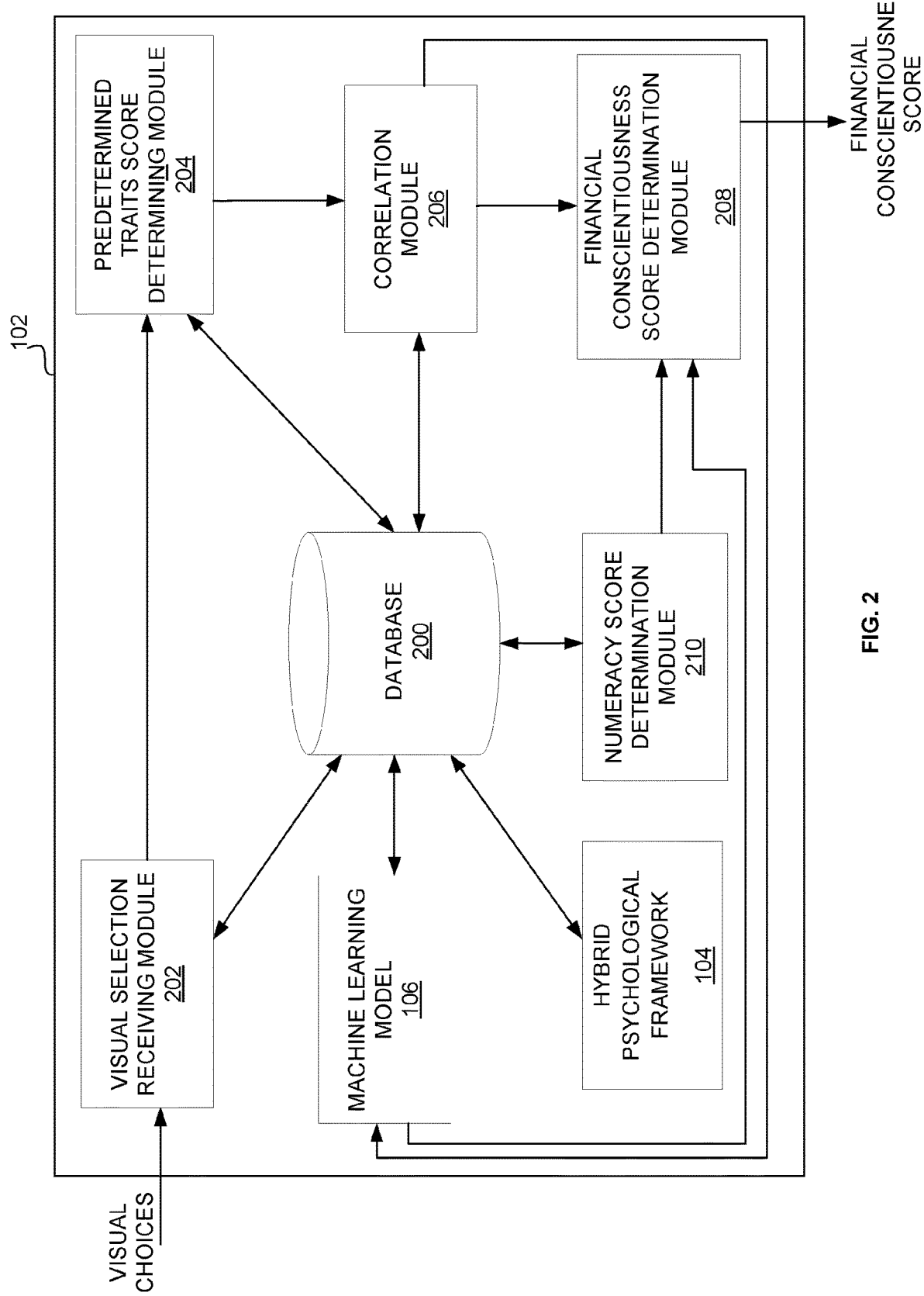
FIG. 2 illustrates an exploded view of the server of FIG. 1 according to some embodiments herein.

FIG. 2 illustrates an exploded view of the server 102 of FIG. 1 according to some embodiments herein. The server 102 includes a database 200, a visual selection receiving module 202, a predetermined traits score determining module 204, a correlation module 206, a financial conscientiousness score determination module 208, a numeracy score determination module 210, a hybrid psychological framework 104, and a machine learning model 106. The database 200 may be communicatively connected with one or more modules of the server 102.

The visual selection receiving module 202 receives the at least one visual selection as the input from the user 116 that is selected from one or more different visual choices that are displayed along with the one or more different visual choices to the user 116 by the user device 114, such that different points are attributed to the one or more different visual choices by the server 102.

The predetermined traits score determining module 204 determines, using the hybrid psychological framework 104, trait scores for a subset of traits based on the points that are attributed to each of the visual choices. The subset of traits is derived by the hybrid psychological framework 104. The hybrid psychological framework 104 is a combination of at least two psychological frameworks. The psychological frameworks include at least two of OCEAN (Openness, Conscientiousness, Extraversion, Agreeableness, and Neuroticism), Myers Briggs Type Indicator (MBTI), Hogan Personality Inventory, or Robert Hare Psychopathy Checklist (PCL-R). The subset of traits may include at least one of sensing, judging, introversion, extraversion, grandiosity, neuroticism, perceiving, intuition or openness of experience, integrity, communication, numeracy, and feeling or agreeableness. Each visual choice may be tagged with at least one trait and may be stored in an image repository. The image repository may include in the database 200.

The correlation module 206 correlates points of at least one of the trait scores for the subset of traits with a previous credit history or a loan repayment record of the user 116. The scores for the subset of traits include an introversion score, an extraversion score, a grandiosity score, a neuroticism score, a perceiving score, an intuition score, an integrity score, a communication score, a judging score, a numeracy score, a sensing score, and a feeling score. The machine learning model 106 is trained by correlating the points of at least one of the trait scores for the subset of traits with a previous credit history or a loan repayment record of the user 116.

The financial conscientiousness score determination module 208 determines, using the trained machine learning model 106, a financial conscientiousness score based on the trait scores for the subset of traits that are determined based on the visual choices that are obtained from the user device 114 in response to the one or more visual questions. The trained machine learning model determines an intent to repay.

The machine learning model 106 may use a generative adversarial networks (GAN) model. The generative adversarial networks (GAN) model may include a logistic regression model. In some embodiments, the machine learning model 106 correlates the financial conscientiousness/machine learning generated score of the user 116 with at least one of the existing alternative credit score or progressive repayment record and retrains the machine learning model 106 when there is a misalignment between the existing alternative credit score of the user 116 with the financial conscientiousness score machine learning generated score that is predicted. In some embodiments, the financial conscientiousness score is determined, using the machine learning model 106, based on an input time taken by the user 116. The machine learning model 106 is trained by correlating a time taken to obtain the input from the user 116 with the previous credit history or the loan repayment record of the user to obtain a threshold time for the trained machine learning model. If the input time taken by the user 116 is more than the threshold time, then the predicted financial conscientiousness score may be low. If the input time taken by the user 116 is less than the threshold time, then the predicted financial conscientiousness score may be high. The input time taken by the user 116 is obtained at each level of the game.

The machine learning model 106 trains with historical numeracy scores and historical financial conscientiousness scores in association with a choice of language by the user 116.

The numeracy score determination module 210 (i) provides that one or more numeracy questions related to the numerical concepts relate to numerals, calculations, logic, and interpretation of numerical content, and (ii) determines the numeracy score by processing the input from the user 116 in response to the at least one numeracy questions and (iii) determines, using the machine learning model 106, the financial conscientiousness score based on the numeracy score in combination with the trait scores of the subset of traits, the machine learning model is trained by correlating the numeracy score with the previous credit history or the loan repayment record of the user to obtain the trained machine learning model.

Figure 3:
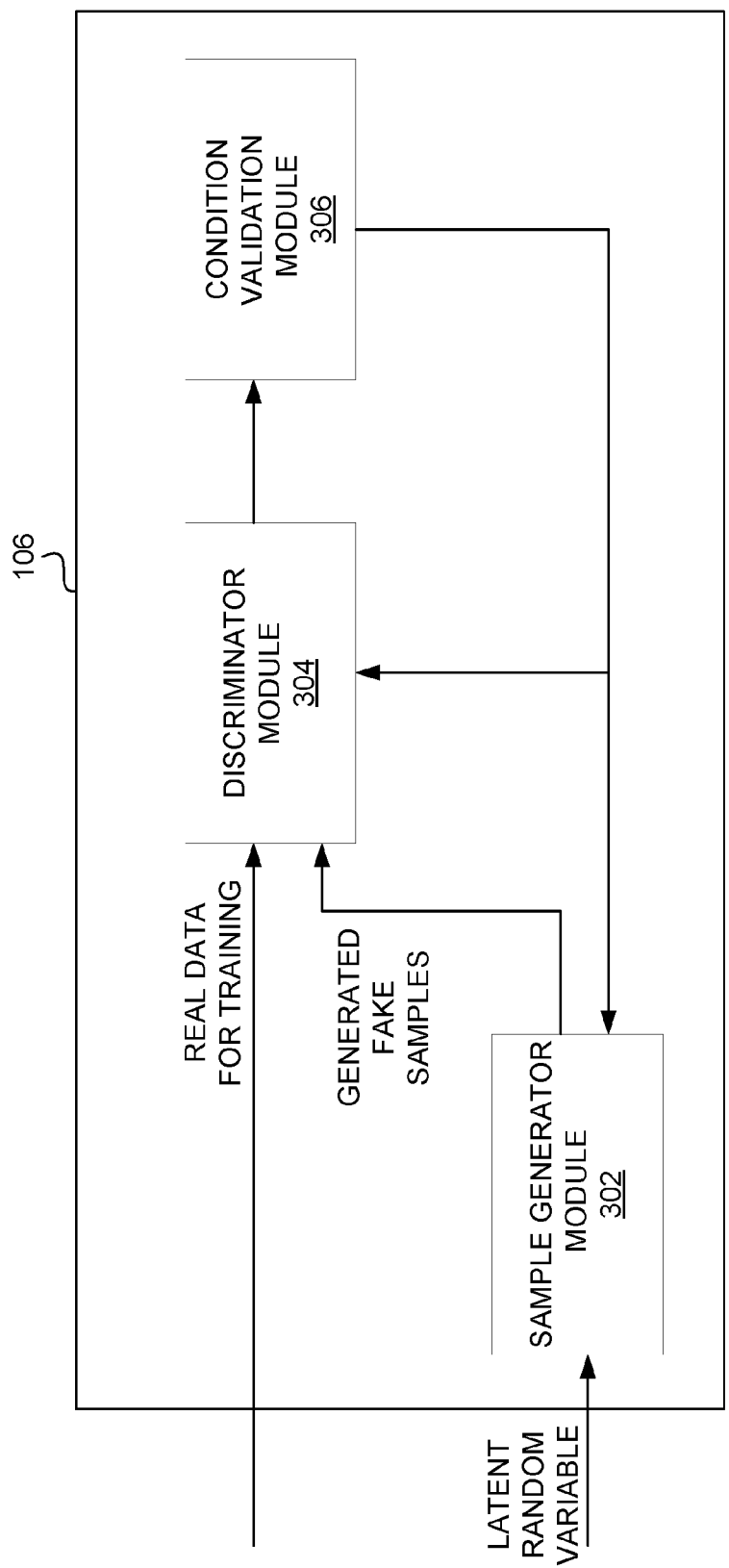
FIG. 3 illustrates an exploded view of the machine learning model of FIG. 0.1 according to some embodiments herein.

FIG. 3 is an exploded view of a machine learning model 106 of FIG. 0.1 according to an embodiment herein. The machine learning model 106 may use a generative adversarial networks (GAN) model. The generative adversarial networks (GAN) model may include a logistic regression model. The machine learning model 106 includes a generator 302, a discriminator 304, a condition validation module 306. The generator 302 provides a training data to the discriminator 304. The training data may include historical numeracy scores and historical alternative credit scores in association with one or more segments that include at least one of a gender, an age, language, language, a type of loans, or time. In some embodiments, the generator 302 is trained to generate a synthetic financial conscientiousness score similar to a real financial conscientiousness score when training data is not available. The discriminator 304 is trained to distinguish real and synthetically generated financial conscientiousness scores. The discriminator 304 assesses the training data to determine the financial conscientiousness score of a user 116. The generator 302 predicts the accurate financial conscientiousness score of the user 116 by correlating the scores for the subset of traits with a previous credit history or a loan repayment record of the user 116. The discriminator 304 compares the determined financial conscientiousness score with the existing credit score or progressive repayment record using the condition validation module 306, and the training data at the generator 302 is updated based on the comparison between the determined financial conscientiousness score with the existing alternative credit score or progressive repayment record, to provide to the generator 302 for training. The generator 302 is retrained when there is a misalignment between the alternative score of the user 116 and a predicted financial conscientiousness score. The following table 1 illustrates the training data of the generator 302 for the financial conscientiousness score of the user 116 for a subset of traits.

TABLE 1

| Predetermined Trait | Coefficient | Inference |
|---|---|---|
| Sensing | 55.19% | Strongly Positive |
| Extroversion | 51.89% | Strongly Positive |
| Judging | 48.16% | Strongly Positive |
| Conscientiousness | 24.30% | Strongly Positive |
| Feelings | 34.68% | Strongly Positive |
| Numeracy | 31.59% | Strongly Positive |
| Thinking | 19.90% | Weakly Positive |
| WinWin | 12.07% | Weakly Positive |
| Lack of Empathy | 12.19% | Weakly Positive |

Figure 4A:
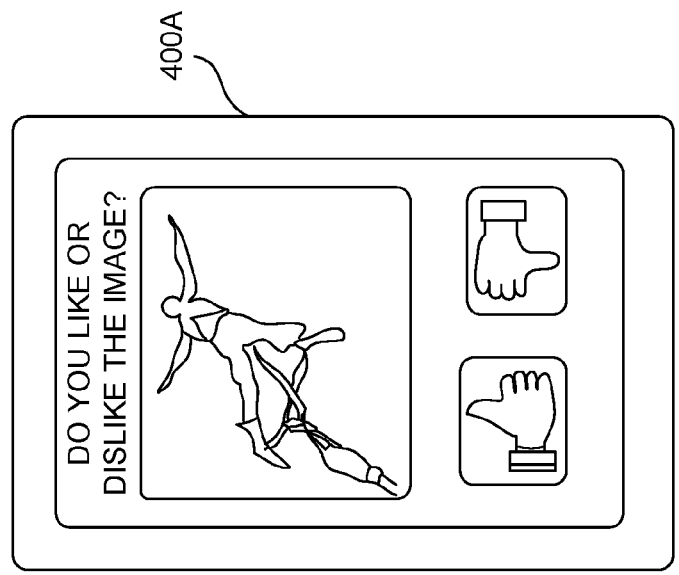
FIGS. 4A-4C are exemplary user interface views of visual questions displayed on the user device of FIG. 1 to obtain at least one visual selection as an input from the user according to some embodiments herein.

FIG. 4A is the first exemplary user interface view 400A of the user device 114 according to some embodiments herein. The first exemplary user interface view 400A displays a question "DO YOU LIKE OR DISLIKE THE IMAGE?" along with an image and "LIKE" and "DISLIKE" options.

In an exemplary embodiment, the server 102 may display the one or more visual questions with a single visual choice for each question. Each visual question at the first level may ask the user 116 to like or dislike the single visual choice that is displayed along with each question. For example, the server 102 may display 20 images at the first level that are related to the context and may ask the user 116 to like or dislike each image. Each image that is displayed at the first level is tagged with at least one trait. The traits include one or more positive traits and one or more negative traits. For example, the one or more positive traits and one or more negative traits include sensing, judging, introversion, extraversion, grandiosity, neuroticism, perceiving, intuition or openness of experience, integrity, communication, and feeling or agreeableness.

If the user 116 likes the image, for example, the server 102 may assign 5 or 10 points. For example, if the user 116 likes the images that are tagged with the traits that include introvert, intuition, thinking, perceiving, and feeling, the server 102 may assign 5 points. If the user 116 dislikes the images that are tagged with the traits that include introvert, intuition, thinking, perceiving, and feeling, the server 102 may assign 0 points. In contradiction, if the user 116 likes the images that are tagged with the traits that include neuroticism and grandiosity, the server 102 may assign 0 points. If the user 116 dislikes the images that are tagged with the behavioral traits that include neuroticism and grandiosity, the server 102 may assign 5 points. If the user 116 likes the images that are tagged with the traits that include judging, sensing, resilience, extroversion, agreeableness, and conscientiousness, the server 102 may assign 10 points. If the user 116 dislikes the images that are tagged with the traits that include judging, sensing, resilience, extroversion agreeableness, and conscientiousness, the server 102 may assign 0 points.

Figure 4B:
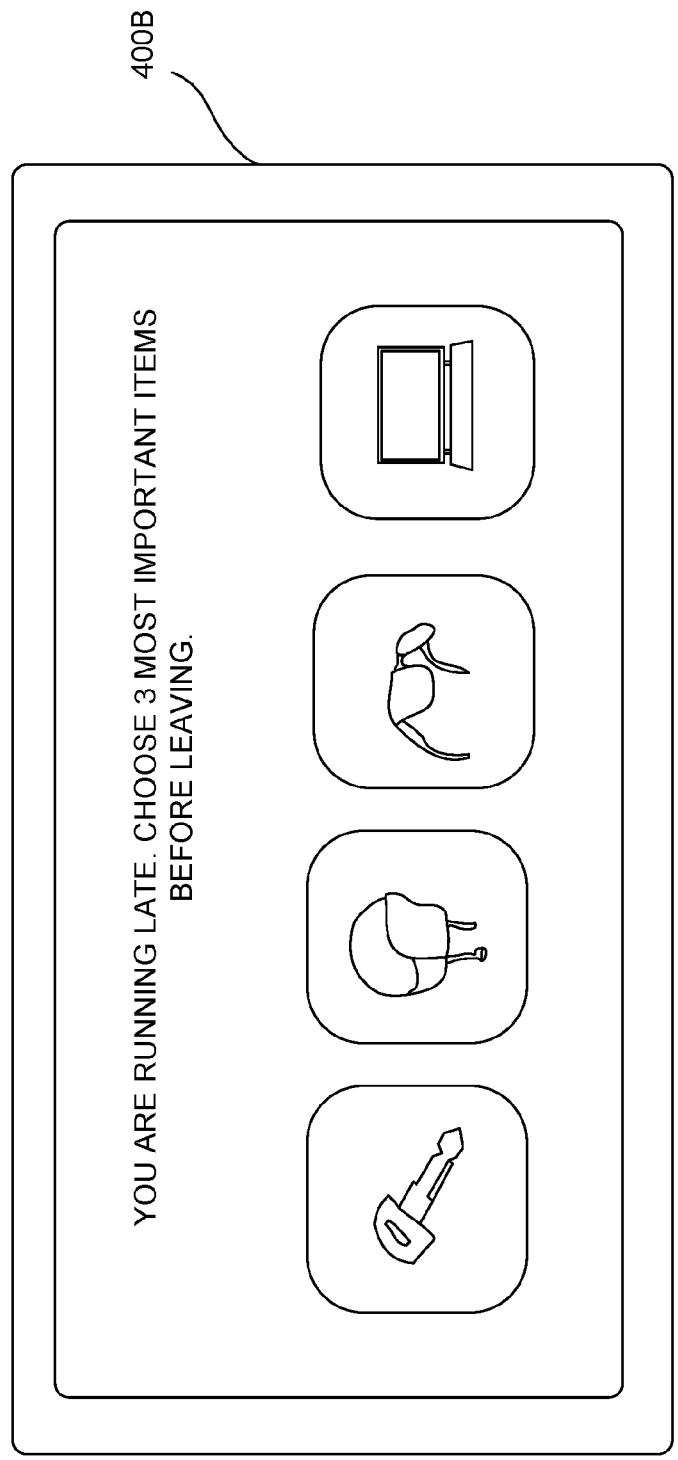

FIG. 4B is a second exemplary user interface view 400B of the user device 114 according to some embodiments herein. The second exemplary user interface view 400B displays a question "YOU ARE RUNNING LATE. CHOOSE 3 MOST IMPORTANT ITEMS BEFORE LEAVING" along with four images as choices. In an exemplary embodiment, at a second level, the server 102 may display the one or more visual questions with two visual choices for each question. Each question at the second level may ask the user 116 to select one among the two visual choices that are displayed along with each visual question. At the second level, the server 102 displays 11 sets of images. Each set of images tagged with two different traits. In one example, a first image is tagged with a trait, "Thinking" and a second image is tagged with a trait, "Integrity". In another example, a first image is tagged with a trait, "Sensing" and a second image is tagged with a trait, "Intuition". In yet another example, a first image is tagged with a trait, "Perceiving" and a second image is tagged with a trait, "Sensing". In yet another example, a first image is tagged with a trait, "Sensing" and a second image is tagged with a rait, "Grandiosity". In yet another example, a first image is tagged with a trait, "Judging" and a second image is tagged with a trait, "Perceiving". In yet another example, a first image is tagged with a trait, "Grandiosity" and a second image is tagged with a trait, "Sensing". In yet another example, a first image is tagged with a trait, "Conscientiousness" and a second image is tagged with a trait, "Perceiving". If the user 116 selects the first image, the server 102 may assign 30 or 40 points for example. If the user 116 selects the second image, the server 102 may assign 10 points for example.

Figure 4C:
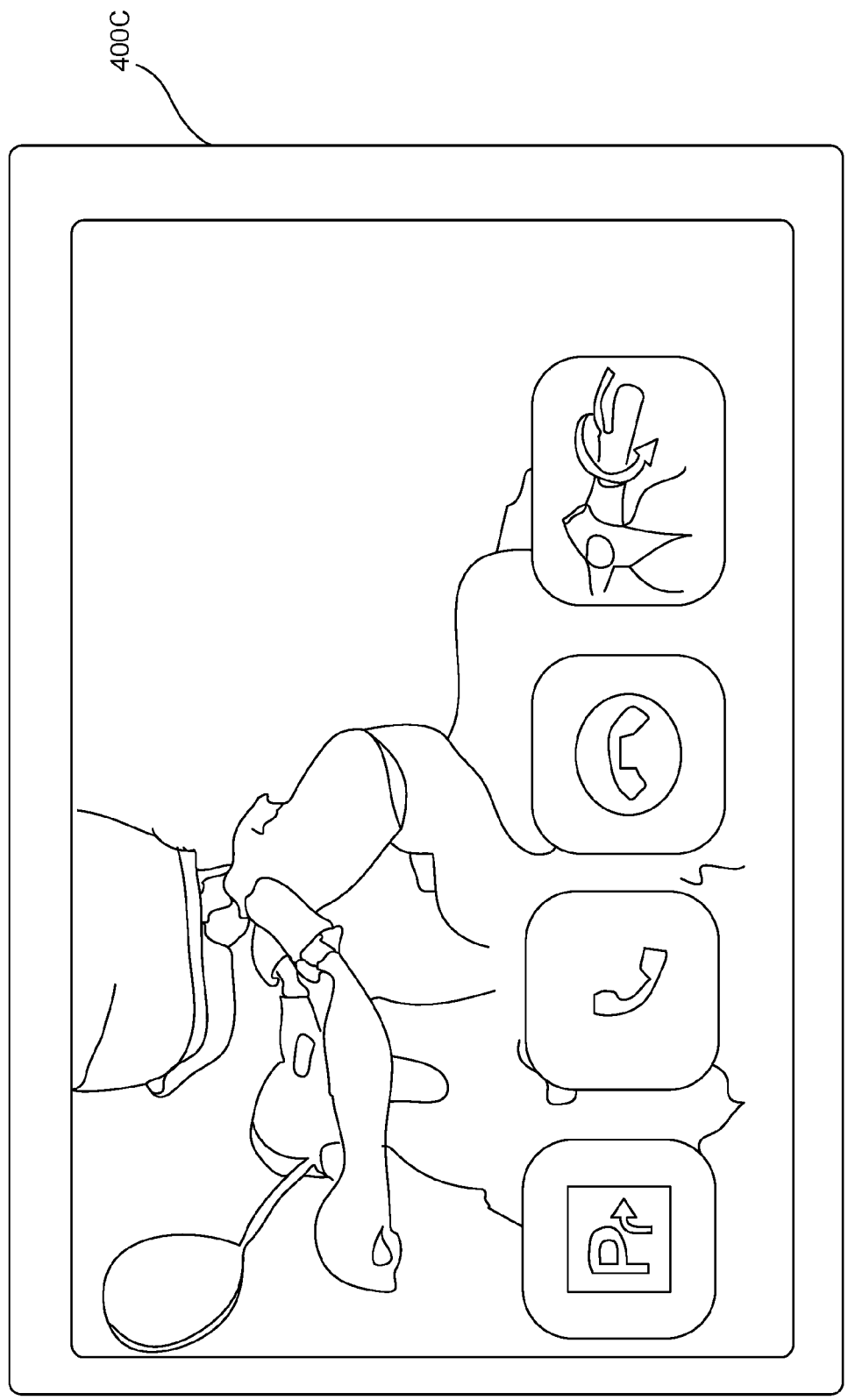

FIG. 4C is a third exemplary user interface view 400C of the user device 114 according to some embodiments herein. The third exemplary user interface view 400C displays a video "along with four images as choices to be selected according to a context of the video displayed. The images that are selected as choices in the video may be, without limitation, one or more.

In an exemplary embodiment, at a third level, the server 102 may display the one or more visual questions with three visual choices for each question. Each visual question at the third level may ask the user 116 to select one or two among the three visual choices that are displayed along with each visual question. In one example, the scenario associated with a first image, a second image, and a third image may include communication, lack of empathy, avoiding conflict respectively. In another example, the scenario associated with a first image, a second image, and a third image may include lack of empathy, win-win, discussing together respectively. In yet another example, the scenario associated with a first image, a second image, and a third image may include judging, sensing, grandiosity respectively. In yet another example, the scenario associated with a first image, a second image, and a third image may include resilience, conscientiousness, agreeableness respectively. In yet another example, the scenario associated with a first image, a second image, and a third image may include lack of remorse, strong integrity, showing remorse respectively. In yet another example, the scenario associated with a first image, a second image, and a third image may include lack of emotional control, high emotional control, scared of telling truth. If the user 116 selects the first image, the server 102 may assign 50 points. If the user 116 selects the second image, the server 102 may assign 30 points. If the user 116 selects the third image, the server 102 may assign 10 points.

Figure 4D:
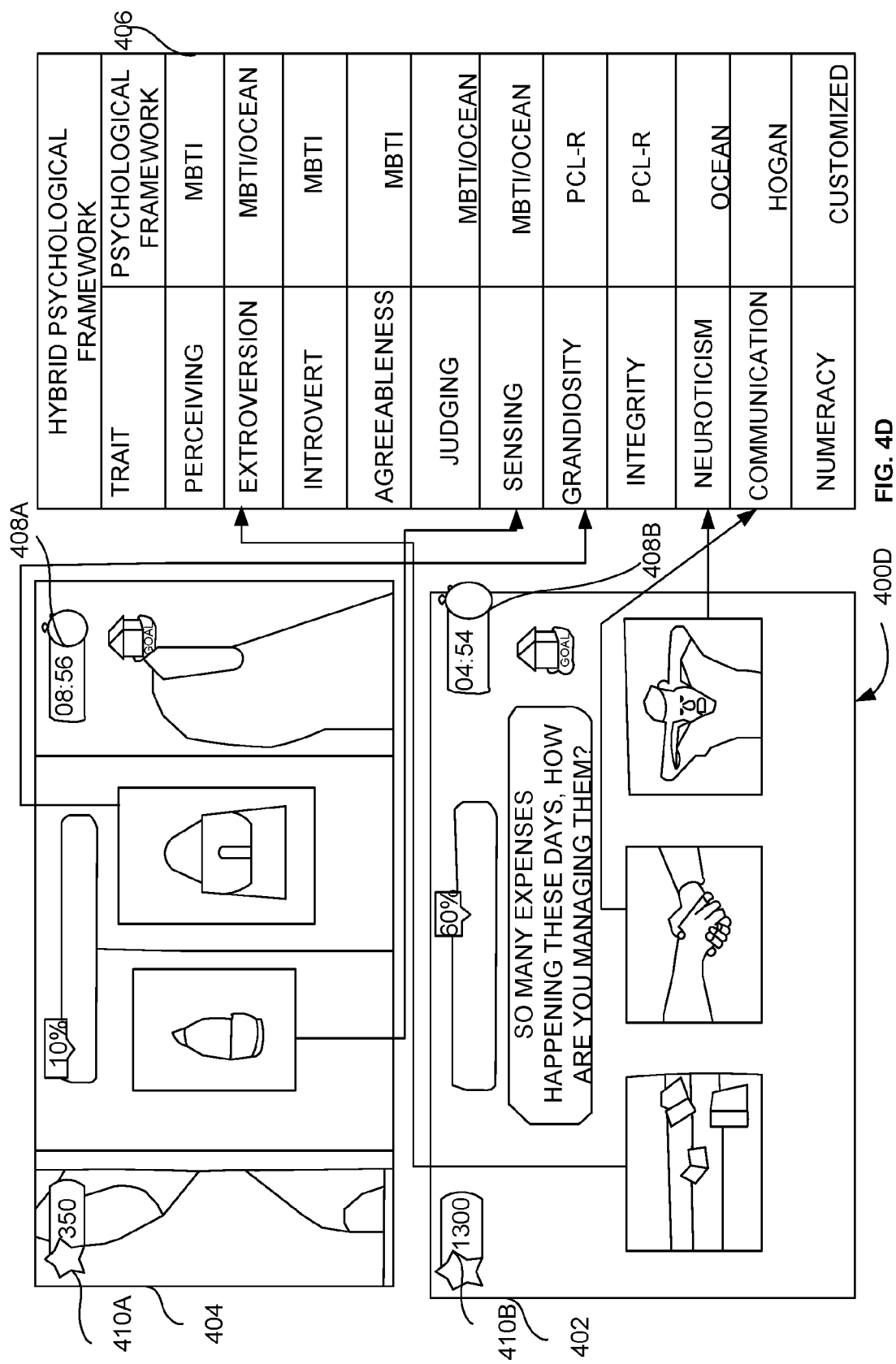
FIG. 4D is an exemplary representation of derivation of traits by processing the input based on obtained visual choices using a hybrid psychological framework according to some embodiments herein.

FIG. 4D is an exemplary representation 400D of derivation of traits by processing an input based on obtained visual choices using a hybrid psychological framework 104 according to an embodiment herein. The exemplary representation 400D illustrates a user interface view with visual choices at 402, a user interface view with visual choices at 404, and a hybrid psychological framework with the traits at 406. The hybrid psychological framework includes the traits and the psychological framework to which the traits belong to. For example, the trait perceiving belongs to the psychological framework Myers Briggs Type Indicator (MBTI). The user interface view with visual choices at 402 depicts two images of bags shown as visual choices to the user 116. The image of a travel bag as a visual choice depicts sensing trait in the hybrid psychological framework 406. The image of a handbag as a visual choice depicts the grandiosity trait in the hybrid psychological framework 406. The user interface view with visual choices at 404 depicts three images shown as visual choices that are relevant for a question, "So many expenses happen these days. How are you managing them?" to the user 116. The first image, few books lying, shown as visual choice depicts extroversion trait in the hybrid psychological framework 406. The second image, shaking hands, shown as a visual choice depicts communication trait in the hybrid psychological framework 406. The third image, a man screaming, shown as a visual choice depicts neuroticism trait in the hybrid psychological framework 406.

In an exemplary embodiment, after initiating the one or more visual questions through the game, the user 116 may commute from one place to another place virtually. For example, the user 116 may commute from his or her home to the office virtually. The user 116 may make a trip to a fort. After initiating the game, a sense of urgency is created for the user 116. For example, the user 116 is informed to reach the office within 10 mins, thereafter to attend a meeting with a customer in the context of the simulated event while commuting from his or her home to the office. During commuting from the home to office, the server 102 displays the one or more visual questions along with visual choices. The one or more visual questions and the visual choices are associated with the scenario within the context.

Figure 5A:
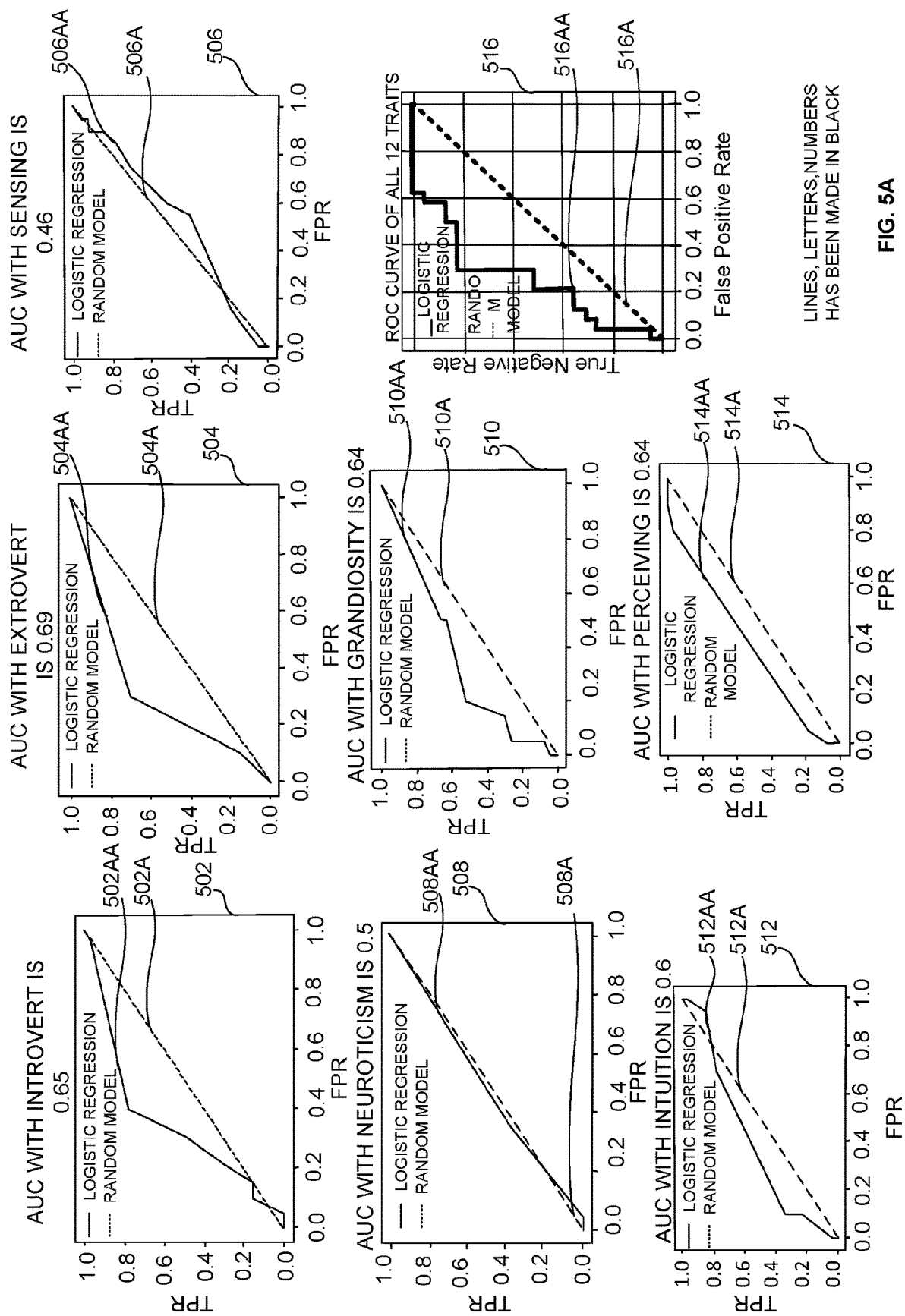
FIG. 5A illustrates a graphical representation of a comparison of the scores of the user for a subset of traits using a random model with the scores of the user for the subset of traits using a logistic regression model according to some embodiments herein.

FIG. 5A illustrates a graphical representation of a comparison of the scores of the user 116 for a subset of traits using a random model with the scores of the user 116 for the subset of traits using a logistic regression model according to some embodiments herein. The graphical representation 502 depicts a true positive rate of an introversion score on the Y-axis and a false positive rate of an introversion score on the X-axis. The graphical representation 502A depicts the introversion score using the random model and the graphical representation 502AA depicts the introversion score using the logistic regression model. The area under a curve for the introversion score using the logistic regression model results is 0.65 as shown in the figure. The area under the curve for the introversion score using the logistic regression model depicts low when compared with the area under the curve for the introversion score using the random model. This depicts the prediction of the introversion score using the logistic regression model is more when compared with a prediction of the introversion score using the random model.

The graphical representation 504 depicts the true positive rate of an extroversion score on the Y-axis and the false positive rate of an extroversion score on the X-axis. The graphical representation 504A depicts the extroversion score using the random model and the graphical representation 504AA depicts the extroversion score using the logistic regression model. The area under the curve for the extroversion score using the logistic regression model is 0.69 as shown in the figure. The area under the curve for the extroversion score using the logistic regression model depicts low when compared with the area under the curve for the extroversion score using the random model. This depicts the prediction of the extroversion score using the logistic regression model is more when compared with the prediction of the extroversion score using the random model.

The graphical representation 506 depicts the true positive rate of a sensing score on the Y-axis and the false positive rate of a sensing score on the X-axis. The graphical representation 506A depicts the sensing score using the random model and the graphical representation 506AA depicts the sensing score using the logistic regression model. The area under the curve for the sensing score using the logistic regression model is 0.46 as shown in the figure. The area under the curve for the sensing score using the logistic regression model depicts low when compared with the area under the curve for the sensing score using the random model. This depicts the prediction of the sensing score using the logistic regression model is less when compared with the prediction of the sensing score using the random model.

The graphical representation 508 depicts the true positive rate of a neuroticism score on the Y-axis and the false positive rate of a neuroticism score on the X-axis. The graphical representation 508A depicts the neuroticism score using the random model and the graphical representation 508AA depicts the neuroticism score using the logistic regression model. The area under the curve for the neuroticism score using the logistic regression model is 0.5 as shown in the figure. The area under the curve for the neuroticism score using the logistic regression model depicts low when compared with the area under the curve for the neuroticism score using the random model. This depicts the prediction of the neuroticism score using the logistic regression model is almost the same when compared with the prediction of the neuroticism score using the random model.

The graphical representation 510 depicts the true positive rate of a grandiosity score on the Y-axis and the false positive rate of a grandiosity score on the X-axis. The graphical representation 510A depicts the grandiosity score using the random model and the graphical representation 510AA depicts the grandiosity score using the logistic regression model. The area under the curve for the grandiosity score using the logistic regression model is 0.69 as shown in the figure. The area under the curve for the grandiosity score using the logistic regression model depicts low when compared with the area under the curve for the grandiosity score using the random model. This depicts the prediction of the grandiosity score using the logistic regression model is more when compared with the prediction of the grandiosity score using the random model.

The graphical representation 512 depicts the true positive rate of an intuition score on the Y-axis and the false positive rate of an intuition score on the X-axis. The graphical representation 512A depicts the intuition score using the random model and the graphical representation 512AA depicts the intuition score using the logistic regression model. The area under the curve for the intuition score using the logistic regression model is 0.6 as shown in the figure. The area under the curve for the intuition score using the logistic regression model depicts low when compared with the area under the curve for the intuition score using the random model. This depicts the prediction of the intuition score using the logistic regression model is more when compared with the prediction of the intuition score using the random model.

The graphical representation 514 depicts the true positive rate of a perceiving score on the Y-axis and the false positive rate of a perceiving score on the X-axis. The graphical representation 514A depicts the perceiving score using the random model and the graphical representation 514AA depicts the perceiving score using the logistic regression model. The area under the curve for the perceiving score using the logistic regression model is 0.64 as shown in the figure. The area under the curve for the perceiving score using the logistic regression model depicts low when compared with the area under the curve for the perceiving score using the random model. This depicts the prediction of the perceiving score using the logistic regression model is more when compared with the prediction of the perceiving score using the random model.

The graphical representation 516 depicts the true negative rate of scores for 12 subset of traits on Y-axis and the false positive rate of scores for 12 subset of traits on X-axis. The graphical representation 516A depicts the scores for 12 subset of traits using the random model and the graphical representation 516AA depicts the scores for 12 subset of traits using the logistic regression model.

Figure 5B:
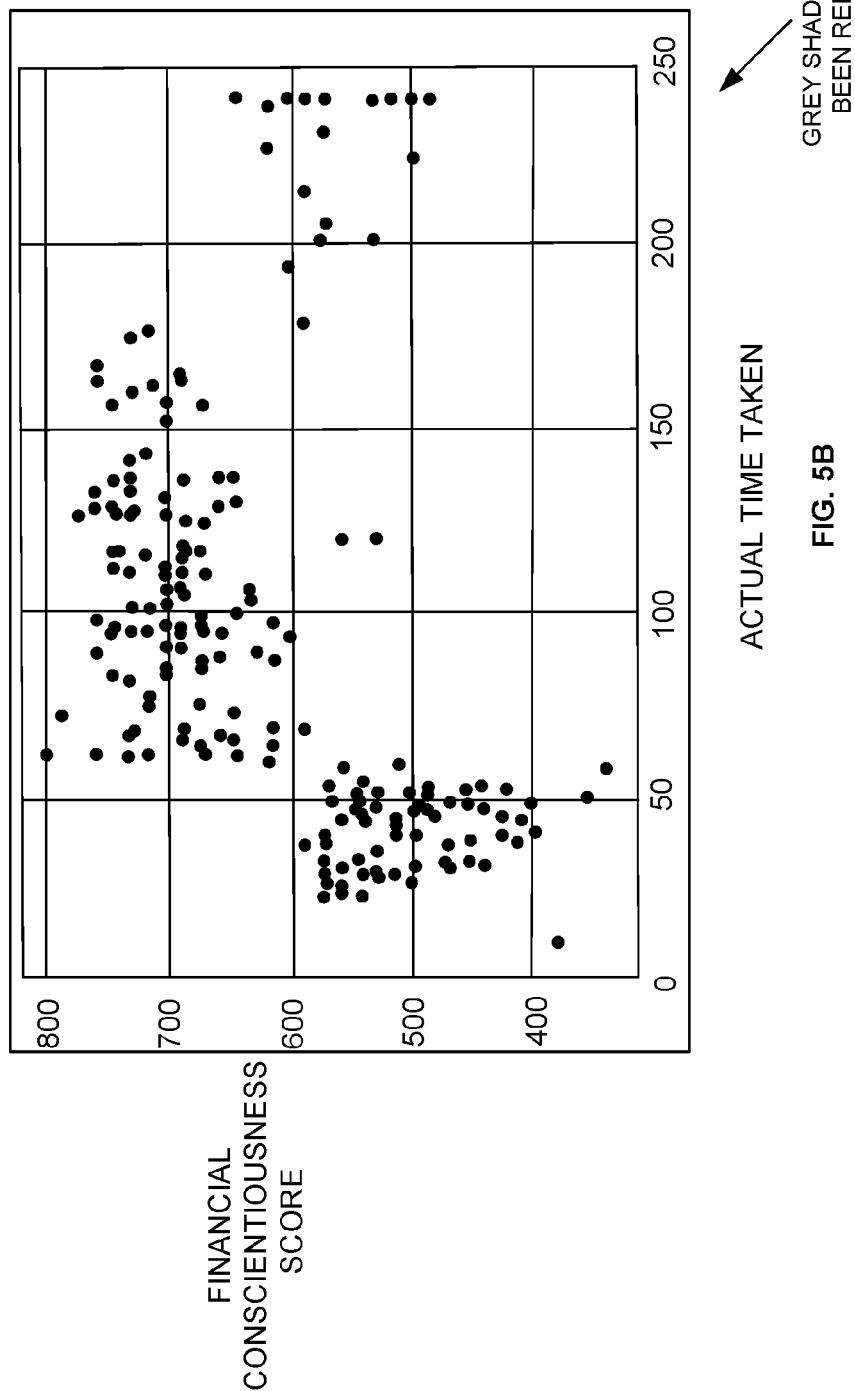

FIG. 5B illustrates a graphical representation of the correlation of actual time taken and the financial conscientiousness score of the user 116 according to an embodiment herein. The graphical representation depicts the financial conscientiousness score on Y-axis and the actual time taken on X-axis for the user 116. The financial conscientiousness score is determined based on the time taken to select visual choices by the user 116. The graphical representation depicts the financial conscientiousness score of the user 116 is more when the actual time taken by the user is more. Also, the financial conscientiousness score of the user is less when the actual time taken by the user 116 is less.

Figure 6A:
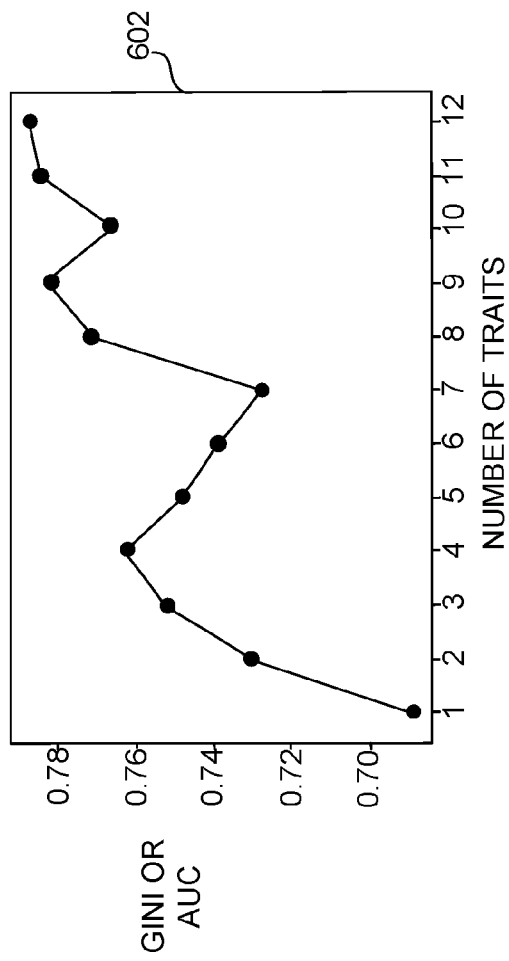
FIGS. 6A-6C illustrate graphical representations of comparison of the financial conscientiousness score with the predicted financial conscientiousness score using the machine learning model according to some embodiments herein.
Figure 6B:
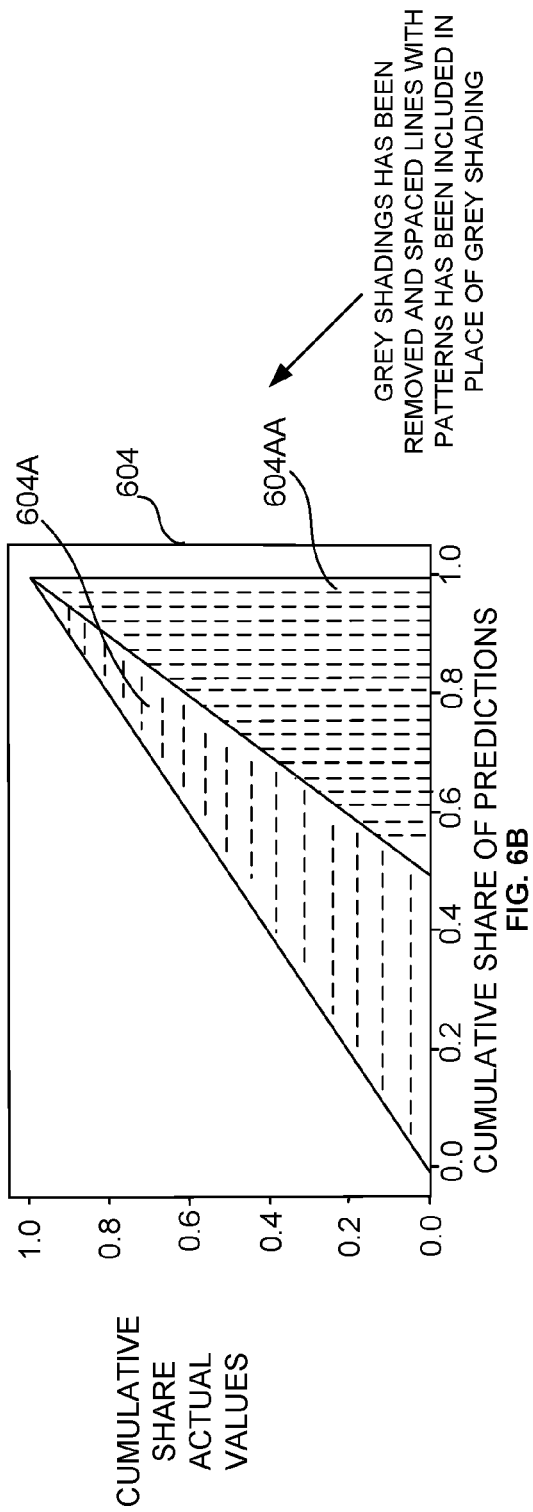
Figure 6C:
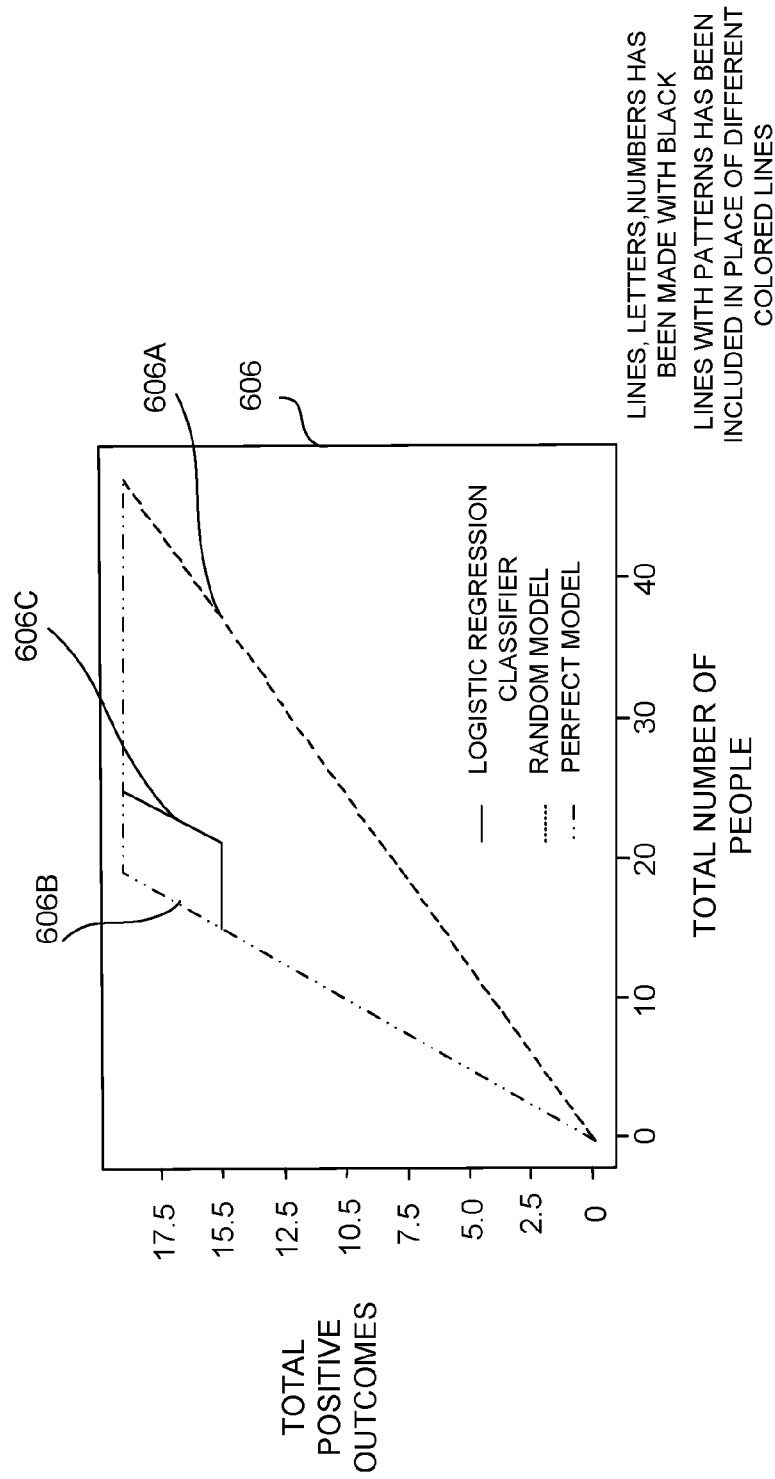

FIGS. 6A-6C illustrate graphical representations of a comparison of the financial conscientiousness score with the predicted financial conscientiousness score using the machine learning model according to some embodiments herein. FIG. 6A depicts a graphical representation of the area under curve or Gini coefficient for a given number of traits. The graphical representation depicts area under curve or Gini coefficient on Y-axis and number of traits on X-axis. The Gini coefficient refers to inequality among values of the financial conscientiousness score across a number of derived traits. For example, the Gini coefficient value is 0.78 for 12 traits (as shown in the figure), so the degree of prediction of the financial conscientiousness score by the machine learning model is higher. Ideally, the Gini coefficient value is 1 for 12 number of traits which indicates a perfect prediction of the financial conscientiousness score by the machine learning model. The following table 2 illustrates the Gini coefficient values for the number of traits.

TABLE 2

| Gini or AUC | Number of traits |
|---|---|
| 0.688 | 1 |
| 0.730 | 2 |
| 0.751 | 3 |
| 0.762 | 4 |
| 0.748 | 5 |
| 0.738 | 6 |
| 0.727 | 7 |
| 0.771 | 8 |
| 0.782 | 9 |
| 0.765 | 10 |
| 0.784 | 11 |
| 0.787 | 12 |

FIG. 6B depicts a graphical representation 604 of comparison of the cumulative share of actual financial conscientiousness score values and cumulative share of predicted financial conscientiousness score values. The graphical representation 604 depicts the cumulative share of actual financial conscientiousness score values on Y axis and cumulative share of predicted financial conscientiousness score values on X axis. The area under 604A depicts the high variation in the cumulative share of actual financial conscientiousness score values and cumulative share of predicted financial conscientiousness score values. The area under 604AA depicts the low variation in the cumulative share of actual financial conscientiousness score values and cumulative share of predicted financial conscientiousness score values.

FIG. 6C depicts a graphical representation 604 of a comparison of total positive outcomes for a total number of people contacted using random model, perfect model, and logistic regression model. The graphical representation 604 depicts the total positive outcomes on the Y-axis and the total number of people contacted on the X-axis. The graphical representation 604A depicts the total positive outcomes for the total number of people contacted using the random model. The graphical representation 604B depicts the total positive outcomes for the total number of people contacted using the perfect model. The graphical representation 604C depicts the total positive outcomes for the total number of people contacted using the logistic regression model. The total positive outcomes are more accurate for the logistic regression model than for the random model, the perfect model.

Figure 7:
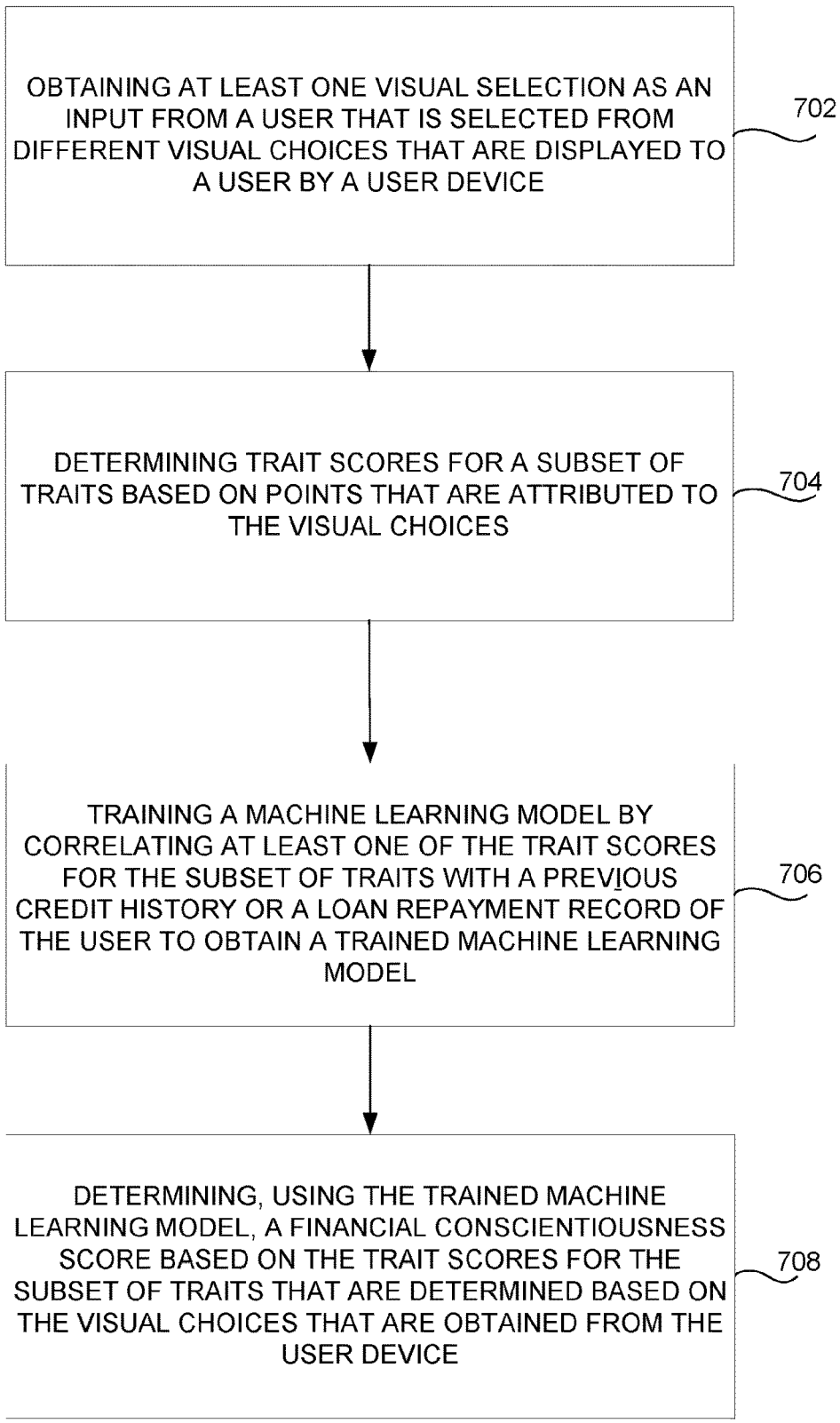
FIG. 7 is a flow diagram that illustrates a method for deriving a financial conscientiousness score from visual choices obtained from a user device using a machine learning model according to some embodiments herein.

FIG. 7 is a flow diagram that illustrates a method for deriving a financial conscientiousness score from visual choices obtained from a user device using a machine learning model according to some embodiments herein. At a step 702, at least one visual selection as an input is obtained from the user that is selected from different visual choices that are displayed to the user by a user device. At a step 704, scores for a subset of traits based on points that are attributed to the visual choices are determined. The traits are derived from a hybrid psychological framework, which is a combination of at least two psychological frameworks. At a step 706, at least one of the scores for the subset of traits with a previous credit history or a loan repayment record of the user is correlated to train the machine learning model and to obtain a trained machine learning model. At a step 708, a financial conscientiousness score based on the scores for the subset of traits that are determined based on the visual choices that are obtained from the user device is determined using the trained machine learning model. The trained machine learning model determines an intent to repay.

Figure 8:
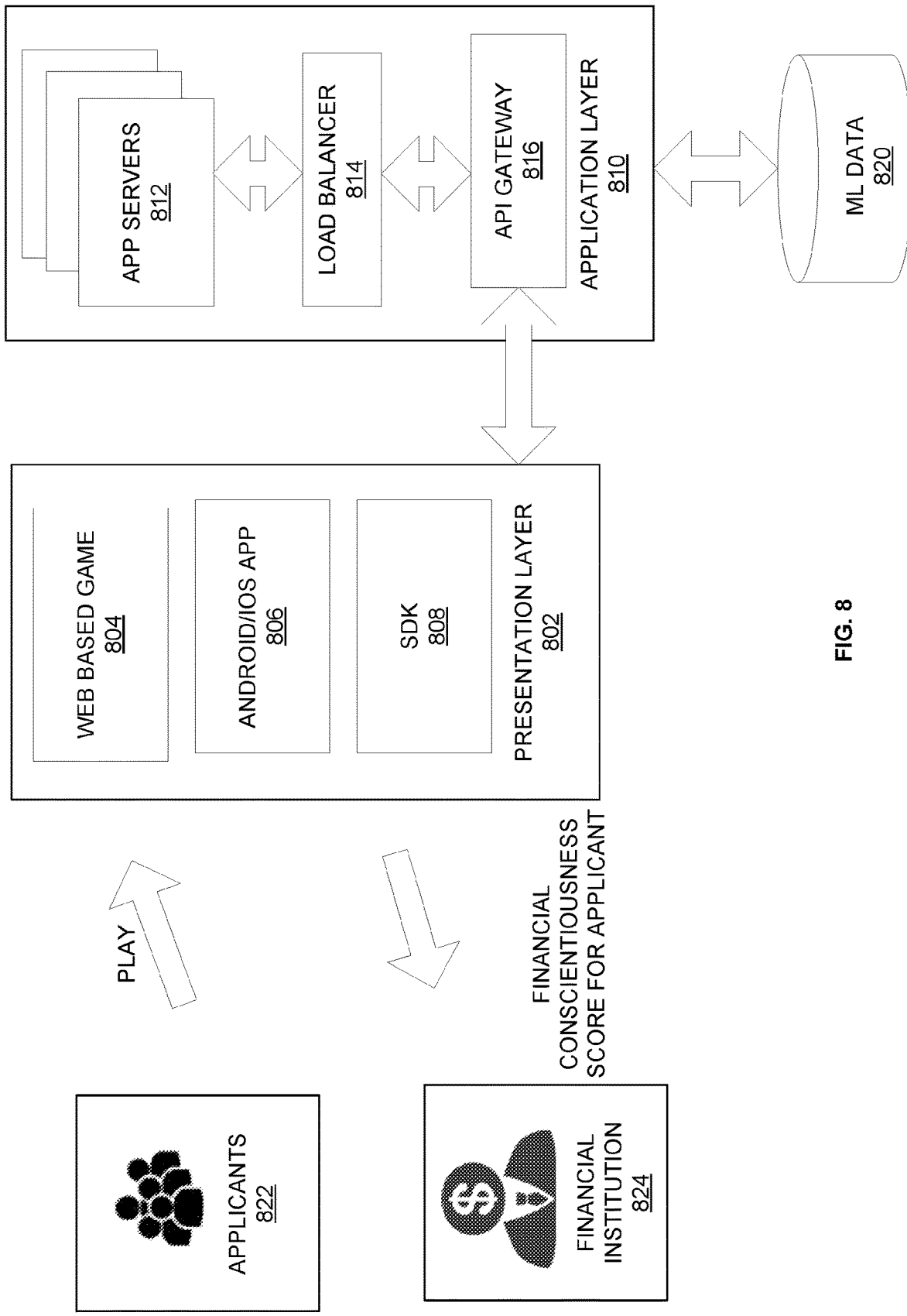
FIG. 8 shows a system architecture for supporting web applications in accordance with the embodiments herein.

FIG. 8 shows a system architecture 800 for supporting web applications according to some embodiments herein. The system architecture 800 is accessible by any number of applicants 822, and a financial institution 824 via a network 112, such as the Internet; the system 800 may alternatively or additionally be accessible via one or more other networks or combinations of networks. For example, architecture 800 may be accessible via a local area network (LAN) (such as a network maintained and owned by a particular organization (e.g., school, company)) and/or a wireless (e.g., 801.11, Zigbee, etc.) or mobile (e.g., cellular) network. Additionally, in some cases the client making a request may be another application 812 hosted within the system 800 or by an application at a remote location over the network; for this reason, the term "applicant 822" herein shall be used to refer to any type of application that is adapted to make a request of the system applicants 822.

Architecture applicants 822 and the financial institution 824 interacts with a presentation layer 802 and an application layer 810, each of which has one or more modules, an android/IoS App 806, an SDK 808, a load balancer 814, and an API gateway 816. As used herein, a "module" is any program, logic, and/or functionality that is implemented in software and/or hardware. The presentation layer 802 handles both requests for providing an entire Web page of content and for executing an API call, the latter typically being one step in accomplishing the former, and includes a web-based game 804 that analyzes requests from the applicant 822. A request can be initiated, for example, by a user (at applicant 822) entering a Web page address (i.e. a uniform resource locator (URL)) associated with a Web application 812 supported by architecture 800. A request may also be generated by the user selecting a link (via, for example, a mouse click) on a Web page that references a Web application 812 supported by architecture 800. A request may also be generated by an application (such as application 812 or 816) making a request for content held in ML data 820.

The application layer 810 is adapted to store in memory and execute Web application 812 written in various programming languages. For example, the application layer 810 can support web applications in any one or more of the PHP, JavaScript, Ruby, Perl, and Python programming languages. Each application 812 has an owner, and as such, the application layer 810 may store Web applications for a plurality of users, each user being able to access at least his or her Web applications stored in the application layer 810. In addition, the Web application 812 is made available to be viewed and used by users other than their respective owners. In other words, the system 800 enables users to create and share application 812 amongst any number of other users. This feature goes beyond existing application hosting websites or social networking websites, which provide a fixed set of one or more applications and at best allow users to create, upload and share content or data. In these existing systems, the applications provided by the site are created only by the site owner and developer; users themselves cannot create new applications to be hosted on the site and shared by others.

Generally, the application 812 access various types of data managed by the ML data 820. The ML data 820 is a common structure in which data can be stored, shared, and retrieved by multiple web applications 812. In other words, the ML data 820 includes a shared set of data that may be accessed and modified by multiple users or web application 812. Objects (data) in the ML data 820 are contributed by architecture 800 itself and/or by users of architecture 800.

The system and method for deriving a financial conscientiousness score from visual choices using a machine learning model are provided. The system achieves improvement to provide risk assessment for various insurance products using locus of control, conscientiousness, respectfulness, honesty and humility, emotional stability along with common factors like repaying credit on time on an insurance policy, driving above the speed limit, wearing a seatbelt, parking illegally, lifestyle changes initiated by a life event, impact of self-declared data. The system enhances the risk assessment process by enabling a comprehensive view of an individual. The system enables the collection of psychological traits that are generated from a selection of choices, situational analysis, or judgments. The collected data of the user can be mapped to historic claims data to produce a future looking view of the likelihood of making a claim, the size of the claim, and whether or not the claim could be fraudulent or have an element of soft fraud. The system can help insurance companies examine the medical history, wealth, demographic profile, lifestyle, and other factors that may relate to a candidate's current and future medical needs. The system can help insurers address potential behavioral patterns by using a combination of gamification and psychometrics, so for example, understanding through a (3-6 minute) game that someone with impulsive personality type can lead to emotional eating and hence obesity can save a lot of money for insurers. The system and method are formulated in multiple languages so that the visual questions are easily understood by those who are not competent in the language and are used to administer the test. The system and method provide a psychological test in less duration of time so that the user cannot lie to obtain a better score, particularly no sufficient time to evaluate the question and determine what response would lead to a higher score is not provided.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for deriving a machine learning generated score that indicates a likelihood of loan repayment based on visual choices related to a plurality of simulated scenarios within a game from a user device, using a machine learning model, the method comprising:

displaying, for the plurality of simulated scenarios within the game that is linked to attainment of a goal under a time constraint, a plurality of images related to the plurality of simulated scenarios, wherein the plurality of images and the plurality of simulated scenarios are shuffled randomly each time the game is played;

obtaining at least one visual choice related to an image from the plurality of images that are displayed at the user device of the user, wherein the at least one visual choice is tagged with at least one behavioral trait that is derived from a hybrid psychological framework that is selected from at least one of (i) OCEAN (Openness, Conscientiousness, Extraversion, Agreeableness, and Neuroticism), (ii) Myers Briggs Type Indicator (MBTI), (iii) Hogan Personality Inventory, or (iv) Robert Hare Psychopathy checklist (PCL-R);

training the machine learning model by correlating historical behavioral trait scores for a subset of behavioral traits of historical users who played the game with previous credit histories or loan repayment records of the historical users who have played the game to obtain a trained machine learning model;

assigning, using the trained machine learning model, points to at least one behavioural trait of the user based on the at least one visual choice to obtain at least one behavioral trait score, wherein the at least one behavioral trait score comprises (i) an introversion score, (ii) an extraversion score, (iii) a grandiosity score, (iv) a neuroticism score, (v) a perceiving score, (vi) an intuition score, (vii) an integrity score, (viii) a communication score, (ix) a judging score, (x) a sensing score, and (xi) a feeling score; and determining a machine learning generated score that indicates the likelihood of the loan repayment of the user based on (i) the points assigned to the at least one behavioural trait using the trained machine learning model, and (ii) a total time taken for obtaining all visual choices within the game to determine creditworthiness and a risk assessment of the user, wherein the trained machine learning model correlates the machine learning generated score of the user that is determined with at least one of an existing alternative credit score or a progressive repayment record and is retrained when there is a misalignment between the at least one of the existing alternative credit score or the progressive repayment record and the machine learning generated score of the user for predicting the machine learning generated score of the user with improved accuracy.

2. The processor-implemented method of claim 1, further comprising providing numeracy questions related to numerical concepts, wherein the numerical concepts relate to at least one of numerals, calculations, logic, and interpretation of numerical content;

determining a numeracy score by processing an input from the user in response to the numeracy questions, wherein the machine learning generated score is determined based on the numeracy score using the trained machine learning model, wherein the machine learning model is trained by further correlating numeracy scores of the users who have played the game with the previous credit histories or the loan repayment records of the users who have played the game to obtain the trained machine learning model.

3. The processor-implemented method of claim 1, further comprising updating the trained machine learning model, based on a comparison between the existing alternative credit score of the user and a predicted machine learning generated score using additional previous credit histories or the loan repayment records and the behavioral trait scores of the users who have played the game.

4. The processor-implemented method of claim 1, wherein the machine learning model uses a Generative Adversarial Network (GAN) model that comprises a generator and a discriminator, wherein the generator is trained to generate synthetic data of the behavioral trait scores of users who played the game and synthetic data of the previous credit histories or loan repayment records of the users who have played the game as similar to real data of the behavioral trait scores of users who played the game and real data of the previous credit histories or loan repayment records of the users who have played the game, wherein the discriminator is trained to distinguish real and synthetic machine learning generated score.

5. The processor-implemented method of claim 1, wherein the plurality of images and the plurality of simulated scenarios are personalized based on previous visual selections to make it more difficult for a user to copy from another user.

6. A system for deriving a machine learning generated score that indicates a likelihood of loan repayment based on visual choices related to a plurality of simulated scenarios within a game from a user device, using a machine learning model, wherein the system comprises:

a memory that stores a set of instructions;

a processor that is configured to execute the set of instructions and is configured to display, for the plurality of simulated scenarios within the game that is linked to attainment of a goal under a time constraint, a plurality of images related to the plurality of simulated scenarios, wherein the plurality of images and the plurality of simulated scenarios are shuffled randomly each time the game is played;

obtain at least one visual choice related to an image from the plurality of images that are displayed at the user device of the user, wherein the at least one visual choice is tagged with at least one behavioral trait that is derived from a hybrid psychological framework that is selected from at least one of (i) OCEAN (Openness, Conscientiousness, Extraversion, Agreeableness, and Neuroticism), (ii) Myers Briggs Type Indicator (MBTI), (iii) Hogan Personality Inventory, or (iv) Robert Hare Psychopathy checklist (PCL-R);

train the machine learning model by correlating historical behavioral trait scores for a subset of behavioral traits of historical users who played the game with previous credit histories or loan repayment records of the historical users who have played the game to obtain a trained machine learning model;

assign, using the trained machine learning model, points to at least one behavioural trait of the user based on the at least one visual choice to obtain at least one behavioral trait score, wherein the at least one behavioral trait score comprises (i) an introversion score, (ii) an extraversion score, (iii) a grandiosity score, (iv) a neuroticism score, (v) a perceiving score, (vi) an intuition score, (vii) an integrity score, (viii) a communication score, (ix) a judging score, (x) a sensing score, and (xi) a feeling score; and determine a machine learning generated score that indicates the likelihood of the loan repayment of the user based on (i) the points assigned to the at least one behavioural trait using the trained machine learning model, and (ii) a total time taken for obtaining all visual choices within the game to determine creditworthiness and a risk assessment of the user, wherein the trained machine learning model correlates the machine learning generated score of the user that is determined with at least one of an existing alternative credit score or a progressive repayment record and is retrained when there is a misalignment between the at least one of the existing alternative credit score or the progressive repayment record and the machine learning generated score of the user for predicting the machine learning generated score of the user with improved accuracy.

7. The system of claim 6, wherein the processor further configured to provide numeracy questions related to numerical concepts, wherein the numerical concepts relate to at least one of numerals, calculations, logic, and interpretation of numerical content;

determine a numeracy score by processing an input from the user in response to the numeracy questions, wherein the machine learning generated score is determined based on the numeracy score using the trained machine learning model, wherein the machine learning model is trained by further correlating numeracy scores of the users who have played the game with the previous credit histories or the loan repayment records of the users who have played the game to obtain the trained machine learning model.

8. The system of claim 6, wherein the processor is configured to further comprise updating the trained machine learning model, based on a comparison between the existing alternative credit score of the user and a predicted machine learning generated score using additional previous credit histories or the loan repayment records of the users and the behavioral trait scores of the users who have played the game.

9. The system of claim 6, wherein the machine learning model uses a Generative Adversarial Network (GAN) model that comprises a generator and a discriminator, wherein the generator is trained to generate synthetic data of the behavioral scores of users who played the game and synthetic data of the previous credit histories or loan repayment records of the users who have played the game as similar to real data of the behavioral trait scores of users who played the game and real data of the previous credit histories or loan repayment records of the users who have played the game, wherein the discriminator is trained to distinguish real and synthetic machine learning generated score.

10. The system of claim 6, wherein the plurality of images and the plurality of simulated scenarios are personalized based on previous visual selections to make it more difficult for a user to copy from another user.

11. One or more non-transitory computer-readable storage mediums storing one or more sequences of instructions, which when executed by one or more processors, causes a method for deriving a machine learning generated score that indicates a likelihood of loan repayment based on visual choices related to a plurality of simulated scenarios within a game from a user device, using a machine learning model performing steps of:

displaying, for the plurality of simulated scenarios within the game that is linked to attainment of a goal under a time constraint, a plurality of images related to the plurality of simulated scenarios, wherein the plurality of images and the plurality of simulated scenarios are shuffled randomly each time the game is played;

obtaining at least one visual choice related to an image from the plurality of images that are displayed at the user device of the user, wherein the at least one visual choice is tagged with at least one behavioral trait that is derived from a hybrid psychological framework that is selected from at least one of (i) OCEAN (Openness, Conscientiousness, Extraversion, Agreeableness, and Neuroticism), (ii) Myers Briggs Type Indicator (MBTI), (iii) Hogan Personality Inventory, or (iv) Robert Hare Psychopathy checklist (PCL-R);

training the machine learning model by correlating historical behavioral trait scores for a subset of behavioral traits of historical users who played the game with previous credit histories or loan repayment records of the historical users who have played the game to obtain a trained machine learning model;

assigning, using the trained machine learning model, points to at least one behavioural trait of the user based on the at least one visual choice to obtain at least one behavioral trait score, wherein the at least one behavioral trait score comprises (i) an introversion score, (ii) an extraversion score, (iii) a grandiosity score, (iv) a neuroticism score, (v) a perceiving score, (vi) an intuition score, (vii) an integrity score, (viii) a communication score, (ix) a judging score, (x) a sensing score, and (xi) a feeling score; and determining a machine learning generated score that indicates the likelihood of the loan repayment of the user based on (i) the points assigned to the at least one behavioural trait using the trained machine learning model, and (ii) a total time taken for obtaining all visual choices within the game to determine creditworthiness and a risk assessment of the user, wherein the trained machine learning model correlates the machine learning generated score of the user that is determined with at least one of an existing alternative credit score or a progressive repayment record and is retrained when there is a misalignment between the at least one of the existing alternative credit score or the progressive repayment record and the machine learning generated score of the user for predicting the machine learning generated score of the user with improved accuracy.

* * * * *